(12) United States Patent
Weeber et al.

(10) Patent No.: US 7,249,809 B2
(45) Date of Patent: Jul. 31, 2007

(54) METHOD AND DEVICE FOR MONITORING A BRAKE SYSTEM

(75) Inventors: Kai Weeber, Heimsheim (DE); Michael Knoop, Ludwigsburg (DE); Klaus-Dieter Leimbach, Eschach (DE)

(73) Assignee: Robert Bosch GmbH, Stuttgart (DE)

( * ) Notice: Subject to any disclaimer, the term of this patent is extended or adjusted under 35 U.S.C. 154(b) by 93 days.

(21) Appl. No.: 10/509,497

(22) PCT Filed: Feb. 20, 2003

(86) PCT No.: PCT/DE03/00527

§ 371 (c)(1),
(2), (4) Date: May 25, 2005

(87) PCT Pub. No.: WO03/082646

PCT Pub. Date: Oct. 9, 2003

(65) Prior Publication Data

US 2005/0253452 A1 Nov. 17, 2005

(30) Foreign Application Priority Data

Mar. 30, 2002 (DE) .............................. 102 14 456

(51) Int. Cl.
*B60T 8/88* (2006.01)
*B60T 13/10* (2006.01)

(52) U.S. Cl. ........................ 303/122.05; 303/122.04; 701/70

(58) Field of Classification Search ............. 303/113.5, 303/122.05, 122.04; 701/70–72; 73/121
See application file for complete search history.

(56) References Cited

U.S. PATENT DOCUMENTS

| 5,089,967 | A | | 2/1992 | Haseda et al. |
| 5,795,039 | A | * | 8/1998 | Fennel et al. .......... 303/122.05 |
| 6,102,492 | A | * | 8/2000 | Diehle et al. ............ 303/113.5 |
| 6,249,736 | B1 | * | 6/2001 | Schmidt et al. ................. 701/70 |
| 6,360,592 | B1 | * | 3/2002 | Harris et al. ................... 73/121 |
| 6,394,561 | B1 | * | 5/2002 | Sakamoto et al. ..... 303/122.05 |
| 6,517,170 | B1 | | 2/2003 | Hofsaess et al. |
| 6,634,221 | B2 | * | 10/2003 | Harris et al. ................... 73/121 |
| 2003/0038539 | A1 | | 2/2003 | Wild et al. |

FOREIGN PATENT DOCUMENTS

| DE | 38 26 982 | 2/1989 |
| DE | 197 47 144 | 6/1998 |
| DE | 198 07 366 | 8/1999 |
| DE | 199 39 386 | 3/2000 |
| DE | 199 14 403 | 10/2000 |
| DE | 199 35 899 | 2/2001 |
| EP | 1 004 494 | 5/2000 |

* cited by examiner

Primary Examiner—Christopher P. Schwartz
(74) Attorney, Agent, or Firm—Kenyon & Kenyon LLP

(57) ABSTRACT

In a method and a device for monitoring a brake system, e.g., a wheel pressure sensor suite of a brake system of a motor vehicle, the fault detection is implemented on the basis of a differential threshold being exceeded by a signal that is representative for the difference of the brake pressures at the individual wheel brakes of a wheel axle. In the process, the differential threshold is set as a function of the averaged rate of increase of the individual pressures at the wheel brakes. Fault detection is carried out on the basis of a model, which takes the instantaneous operating state of the brake system into account.

9 Claims, 4 Drawing Sheets

METHOD AND DEVICE FOR MONITORING A BRAKE SYSTEM

FIELD OF THE INVENTION

The present invention relates to a method and a device for detecting a malfunction of a brake system, e.g., for detecting a malfunction of the wheel pressure sensor suite of a brake system of a motor vehicle during activation of the brake system as a function of two operating modes. The present invention also relates to a method and a device for operating a system, which controls and/or regulates the functions of a motor vehicle as a function of the detected malfunction.

BACKGROUND INFORMATION

In active steering systems, described, for example, in German Published Patent Application No. 38 26 982, the brake pressures are able to be detected at the separately controlled wheels of an axle and, sparing a dead zone, their difference $\Delta P$ may be utilized at low $\Delta P$ to obtain an additional steering angle $\delta$. This considerably increases the driving stability during braking, in particular on uneven roadways.

SUMMARY

An example embodiment of the present invention relates to a method and a device for detecting a malfunction of a brake system of a motor vehicle. At least two operating modes may exist during activation of the brake system. A malfunction may be detected in a first manner when a first operating mode is present, and a malfunction may be detected in a second manner when a second operating mode is present.

Possible faults of a brake system, e.g., in the wheel pressure sensor suite of the brake system may be able to be detected in each operating mode of the brake system, if possible.

An example embodiment of the present invention is a method or a device for operating a system which controls and/or regulates the functions of a motor vehicle. For instance, such a system may be a steering system. According to an example embodiment of the present invention, the control and/or regulation is implemented at least as a function of the operating state of a brake system installed in the motor vehicle. In a steering system it may be provided, for instance, that an additional steering angle be adjusted as a function of the operating state of the brake system. The operating state of the brake system is characterized by the variables utilized for operating the brake system, such as the brake pressure in the individual wheel brakes or variables derived therefrom. It may be provided, for example, that the additional steering angle may be ascertained as a function of the difference of the brake pressures at the wheels of an axle. The use of an active steering system may provide the possibility of utilizing a brake-pressure differential $\Delta P$ at the wheel brakes of a wheel axle to control the steering angle of motor vehicles, e.g., when braking on an uneven roadway.

In response to a detected malfunction of the brake system, e.g., in the wheel pressure sensor suite of the brake system, the dependency on the operating state of the brake system may at least be reduced. In the process, the malfunction is detected in a first manner when a first operating mode of the brake system is present, and the malfunction is detected in a second manner when a second operating mode of the brake system prevails.

If a malfunction of the brake system has occurred, e.g., of the wheel pressure sensor suite of the brake system, and this fault were not detected properly, it may affect the functions of the system controlling and/or regulating the motor vehicle. For instance, an incorrectly determined brake-pressure differential may result in a faulty additional steering angle. An example embodiment may provide at least reducing the effect of a malfunction of the brake system on the regulating or controlling system.

In an example embodiment of the present invention, it may be provided that the brake system is configured such that braking interventions may be implemented independently of the wish of the vehicle driver. The existence of the first operating mode is detected when no wheel-individual braking intervention takes place during a braking operation. The existence of the second operating mode is detected when a wheel-individual braking intervention takes place during a braking operation. In the monitoring of the brake system according to this example embodiment, the driver checks during activation of the brake system whether an additional, driver-independent braking intervention is taking place or has taken place within a certain latency period. The differentiation between two existing operating modes thus takes place as a function of the existence of a wheel-individual braking intervention, the query of an intervention by an anti-lock braking system (ABS) being provided, for example. As may be conventional, a wheel-individual braking intervention takes place in an anti-lock braking system when the wheel has a tendency to lock up. In the case of a lock-up tendency, the brake pressure is generally kept constant or is reduced. Thus, a fault detection may be possible during braking with or without wheel-individual braking interventions.

In an example embodiment of the present invention, it may be provided that the brake pressures at the wheel brakes are modified when the brake system is activated and the vehicle has at least one wheel axle and when brake-pressure variables are detected that represent the brake pressure at at least two wheel brakes of an axle. As long as no wheel-individual braking intervention takes place and if a latency period has elapsed after conclusion of a wheel-individual braking intervention, a differential variable representing the difference of the detected wheel-brake pressures is ascertained. The malfunction is detected on the basis of the differential variable exceeding a differential threshold. For example, it may be provided that the fault detection may be performed in a motor vehicle having at least two wheel axles. It is possible for the fault detection to be carried out separately at each wheel axle.

It may be provided that the differential threshold may assume various values. This makes it possible to achieve a fault detection that is adapted to the particular existing braking situation.

It may be provided that, once the first operating mode is detected, different values are set for the differential threshold as a result of the rate of increase of the brake pressure, which is averaged using all brake-pressure variables of an axle. The rate of increase may be ascertained by estimation with the aid of a differential quotient, the differential quotient being determined as a function of the difference of two averaged brake-pressure variables detected at different times. To estimate the rate of increase, a maximum value from at least two differential quotients may be utilized. This may compensate for short-term sudden drops of the gradient without reducing the dynamics of the gradient calculation.

It is possible to use the offset-corrected brake-pressure variables as brake-pressure variables, the offset being estimated from the low-pass filtered brake-pressure signal of each individual wheel brake.

Brake systems may have a main brake cylinder to generate a brake admission pressure. With a view to fault detection when the second operating mode is present, it may be provided that the value for the differential threshold is set as a function of:
- an admission-pressure variable representing the admission pressure in the main brake cylinder; and
- the rate of increase, e.g., of the differential quotient.

The fault detection during both operating modes may be performed as a function of the dynamic response of the pressure signal at the wheel brakes or the main brake cylinder of the motor vehicle.

It may be provided that, following a wheel-individual braking intervention, the fault detection may be at least modified within a specifiable time duration. For example, it may be provided that the fault detection may be suspended within a specifiable time duration (latency period) following a wheel-individual braking intervention.

According to an example embodiment of the present invention, a method for detecting a malfunction of a brake system of a motor vehicle, at least two operating modes possibly present during activation of the brake system includes: detecting a malfunction in a first manner while a first operating mode is present; and detecting a malfunction in a second manner while a second operating mode is present.

The method may be adapted to detect a malfunction of a wheel-pressure sensor suite of the brake system of the motor vehicle.

The brake system may be configured to implement braking interventions independently of a wish of a driver of the motor vehicle. The method may include: detecting existence of the first operating mode when no wheel-individual braking intervention occurs during a braking operation; and detecting existence of the second operating mode when a wheel-individual braking intervention occurs during a braking operation.

The motor vehicle may include at least one wheel axle. The method may include: during activation of the brake system, modifying and detecting brake pressures at at least two wheel brakes of an axle; ascertaining a differential variable that represents a difference of the detected brake pressures; and implementing fault detection separately at each wheel axle on the basis of the differential variable exceeding a differential threshold.

The differential threshold may have different values.

The method may include: determining a differential quotient as a function of a difference of two averaged brake-pressure variable recorded at different times; ascertaining a rate of increase of the brake pressure by estimation based on the differential quotient and based on a maximum value from at least two differential quotients; and upon detection of the first operating mode, setting the different values of the differential threshold on the basis of the rate of increase of the brake pressure averaged with all brake pressure variables of an axle.

The brake pressure variables may include offset-corrected brake pressure variables, and the method may include estimating an offset from a low-pass filtered brake pressure signal of each wheel brake.

The brake system may include a main brake cylinder configured to generate a brake admission pressure, and the method may include, upon detection of the second operating mode, setting a value for the differential threshold as a function of: (a) an admission-pressure variable that represents the admission pressure in the main brake cylinder; and (b) a rate of increase of a differential quotient.

The method may include, following a wheel-individual braking intervention, modifying a fault detection for a specifiable time duration to suspend the fault detection for the specifiable time duration following the wheel-individual braking intervention.

According to an example embodiment of the present invention, a method for operating a system at least one of (a) controlling and (b) regulating functions of a motor vehicle, the at least one of (a) control and (b) regulation implementable at least as a function of an operating state of a brake system available in the motor vehicle, the operating state of the brake system characterized by variables utilized for operating the brake system, includes: detecting a malfunction in a first manner when a first operating mode of the brake system is present; detecting a malfunction in a second manner while a second operating mode of the brake system is detected; and in response to a detected malfunction of the brake system, at least reducing dependency on the operating state of the brake system.

The malfunction detected in the detecting steps may include a malfunction of a wheel pressure sensor suite of the brake system.

According to an example embodiment of the present invention, a device for detecting a malfunction of a brake system of a motor vehicle, at least two operating modes possible present during activation of the brake system, includes: an arrangement configured to detect a malfunction in a first manner when a first operating mode is detected and to detect a malfunction in a second manner when a second operating mode is detected.

The malfunction may include a malfunction of a wheel-pressure sensor suite of the brake system of the motor vehicle.

The brake system may be configured to implement brake interventions independently of a wish of a driver of the motor vehicle, and the arrangement may be configured to detect presence of the first operating mode when no wheel-individual brake intervention occurs during a brake operation and to detect presence of the second operating mode when a wheel-individual brake intervention occurs during a brake operation.

According to an example embodiment of the present invention, a device for operating a system that at least one of (a) controls and (b) regulates functions of a motor vehicle, the at least one of (a) control and (b) regulation implementable at least as a function of an operating state of a brake system present in the motor vehicle, the operating state of the brake system characterized by variable utilized to operate the brake system, includes: an arrangement configured to detect a malfunction of the brake system in a first manner when a first operating mode of the brake system is present, to detect a malfunction in a second manner when a second operating mode of the brake system is determined, and to at least reduce a dependency on the operating state of the brake system.

The brake system may include a wheel pressure sensor suite.

DETAILED DESCRIPTION

Figure 1:
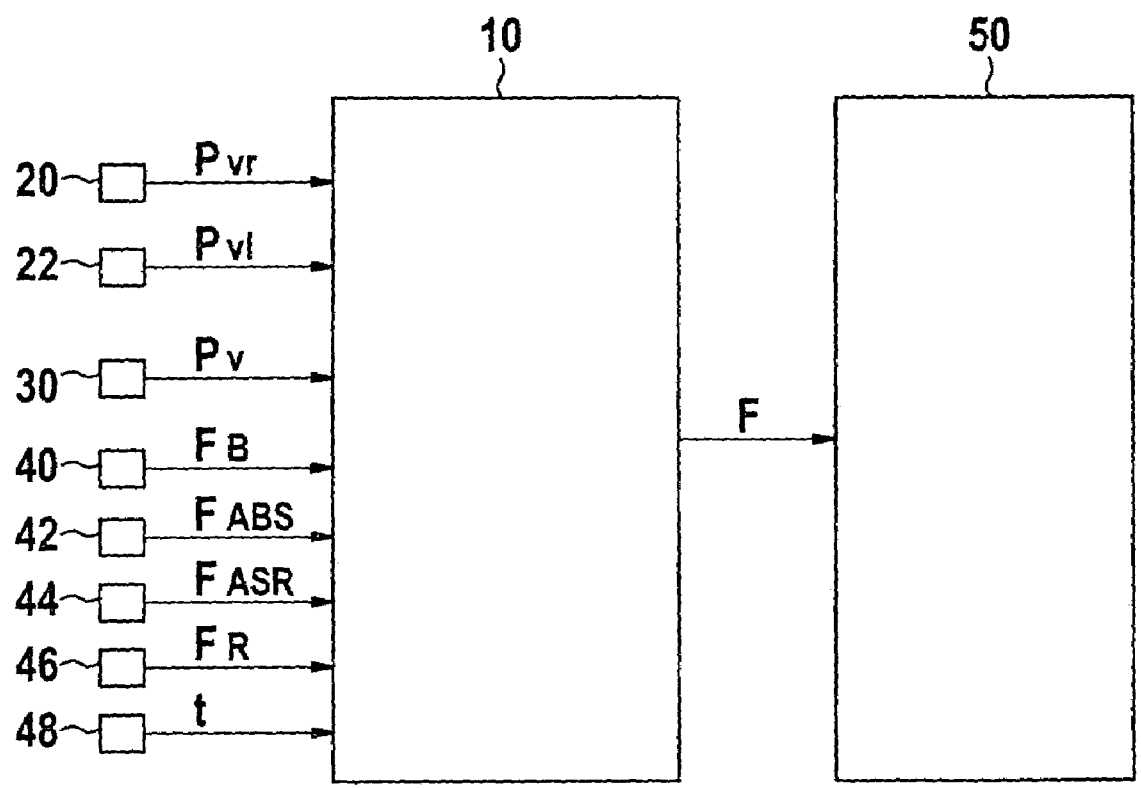
FIG. 1 schematically illustrates the recording of the operating variables of the brake system for fault detection and the forwarding of a fault to a controlling and/or regulating system of the motor vehicle.

FIG. 1 illustrates an exemplary embodiment for monitoring a brake system. In the process, pressure signals $p_n$ of the wheel brakes at each individual axle are transmitted to block 10, the pressure signals representing the brake pressure. For clarity, however, only pressure signals $p_{fr}$ (20) and $p_{fl}$ (22) of an individual axle having two wheel brakes have been included in FIG. 1. $p_{fr}$ represents the brake-pressure signal in the front right wheel brake, and $p_{fl}$ represents the brake-pressure signal in the front left wheel brake. However, this may easily be expanded to a plurality of axles and to additional wheel brakes per axle. In addition to the pressure signals of the wheel brakes, block 10 is provided with pressure signal $p_a$ (30) for the admission pressure in the main cylinder.

Furthermore, state identifiers of braking interventions in the form of flags are forwarded to block 10. In this context, unset flag 0 corresponds to the operation of the brake system without braking intervention, and set flat 1 corresponds to the occurrence of a braking intervention. Different flags are defined so as to differentiate the various possible braking interventions, these being supplied to block 10. For instance, the driver-initiated activation of the brake system is represented by flag $F_B$, the intervention in the brake system is represented by an anti-lock braking system (ABS) by flag $F_{ABS}$, the intervention by a traction control system (TCS) is represented by flag $F_{TCS}$, and the intervention by a general vehicle control is represented by the flag $F_C$. Moreover, clock generator t (48) makes it possible for block 10 to determine time difference Δt with respect to the most recent braking intervention. This is accomplished in that the time measurement is started by the change of a flag from 1 to 0.

Figure 2:
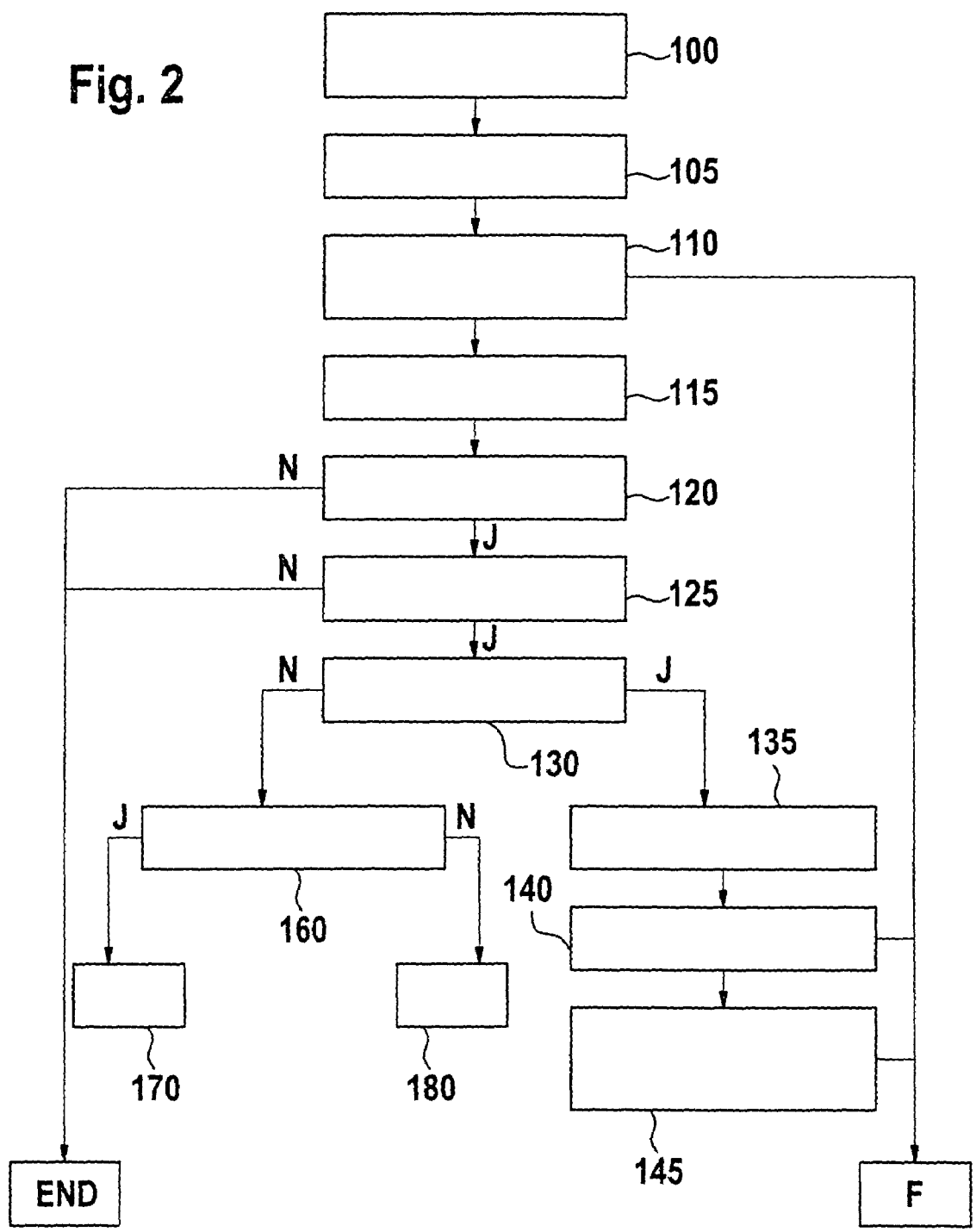
FIG. 2 illustrates the procedure for differentiating the two operating modes in which the fault detection is active in a driver-initiated braking intervention.

With the aid of the read-in values 20 through 46 as well as time measurement Δt in connection with clock generator t (48), a malfunction of the brake system of a motor vehicle is detected in block 10 as illustrated in FIG. 2. Because of the detected malfunction (signal F), the controlling and/or regulating function of a system for operating a motor vehicle is modified in a second block 50. Block 50 may represent a steering system, for example, as mentioned in the introduction, which generates an additional steering angle as a function of the operating state of the brake system.

FIG. 2 illustrates an exemplary embodiment of a malfunction detection of a brake system of a motor vehicle. The illustrated program is started at specified cycles throughout the entire operation. The flow diagram illustrates the situation in the detection of two different operating modes in a driver-dependent braking intervention.

For this purpose, the flags for a driver-dependent braking intervention—$F_B$—and for a driver-independent braking intervention such as an anti-lock braking system (ABS)—$F_{ABS}$—, a traction control system (TCS)—$F_{TCS}$—or a general vehicle control—$F_C$—are first queried in step 100. In addition, time difference Δt, which has elapsed since the most recent intervention of a driver-independent braking intervention, is determined. In the following step 105, pressure signals $p_n$ of each individual wheel brake are read in. In step 110, each individual pressure signal is monitored for compliance with the measuring range specified by the particular type of design of the associated pressure sensor. If one of the pressure signals is outside the measuring range, a fault (signal F/FIG. 1) is detected. Subsequently, in step 115, the stored value of the offset from the last program cycle is used as estimated value for the pressure offset. Using this pressure offset, the offset-corrected pressure signals $p_{corr,n}$ are thus determined.

In the following step 120, it is ascertained whether a possibly available traction control system is regulating or controlling the drive slip of a wheel. Processing of the program will be continued only if the traction control system (TCS) is not active ($F_{TCS}=0$) and a certain latency period $t_{TCS}$ has elapsed since the last activation of the traction control system (TCS) (Δ>$t_{TCS}$). In step 125, the braking intervention of a vehicle controller $F_C$ is checked in general. The program is continued if a vehicle controller is not active ($F_C=0$) and a certain latency period $t_C$ has elapsed since the last intervention by a vehicle controller (Δt>$t_C$).

The following step 130 checks the activation of the brake system by the driver of the motor vehicle on the basis of set flag $F_B$ for the driver-dependent braking intervention. If the driver has not initiated any braking intervention ($F_B=0$) and if a specific latency period $t_B$ has elapsed since the last driver-initiated activation of the brake system (Δt>$t_R$), the offset calculation will be performed in step 135. To estimate the offset of the pressure signals, each pressure signal is individually conducted via a low pass filter. The filter is stopped as soon as a driver-activated braking or a braking intervention takes place. The filtering is resumed when a specified latency time has elapsed since the most recent driver-activated braking or the last braking intervention. In step 140, the ascertained absolute amounts of the offset values are checked with respect to an exceedance of an offset threshold. If the offset threshold has been exceeded, a fault (signal F/FIG. 1) is detected. If no fault has occurred, a zero-value monitoring of the wheel-brake pressures is carried out in step 145. This zero-value monitoring is based on the aspect that all wheel-brake pressures (with the exception of slight measuring errors) are equal to zero if no driver-activated braking and no braking intervention are taking place. Zero-value faults (signal F/FIG. 1) are detected when the absolute amounts of the corrected pressures exceed a zero-value threshold and no driver-activated braking and no braking intervention take place at the same time or have taken place within a latency period. If no fault is detected, the program is terminated and restarted with the next polling cycle.

If the activation of the brake system by the driver of the motor vehicle has been detected in step 130 based on set flag FB ($F_B=1$) or if the elapsed time since the last driver-activated braking intervention is below latency period $t_B$, it is checked in step 160 whether a braking intervention by an anti-lock braking system (ABS) is taking place (Flag $F_{ABS}$) and more than a specific latency period $t_{ABS}$ has elapsed since the last intervention of an anti-lock braking system. On the basis of this check, the subsequent fault detection is subdivided into operating mode I (step 170) and II (step 180). Operating mode I (step 170) is executed in the event that $F_{ABS}=0$ and (Δt>$t_{ABS}$), i.e., the driver-dependent braking intervention occurs without any additional brake regulation by the anti-lock braking system (ABS) and the latency period for the intervention of an anti-lock braking system (ABS) is exceeded. On the other hand, operating mode II (step 180) with $F_{ABS}=1$ is executed when the driver-dependent braking intervention occurs with an additional brake regulation by the anti-lock braking system (ABS) or the latency period for the intervention of an anti-lock braking system (ABS) has not yet been exceeded.

Figure 3:
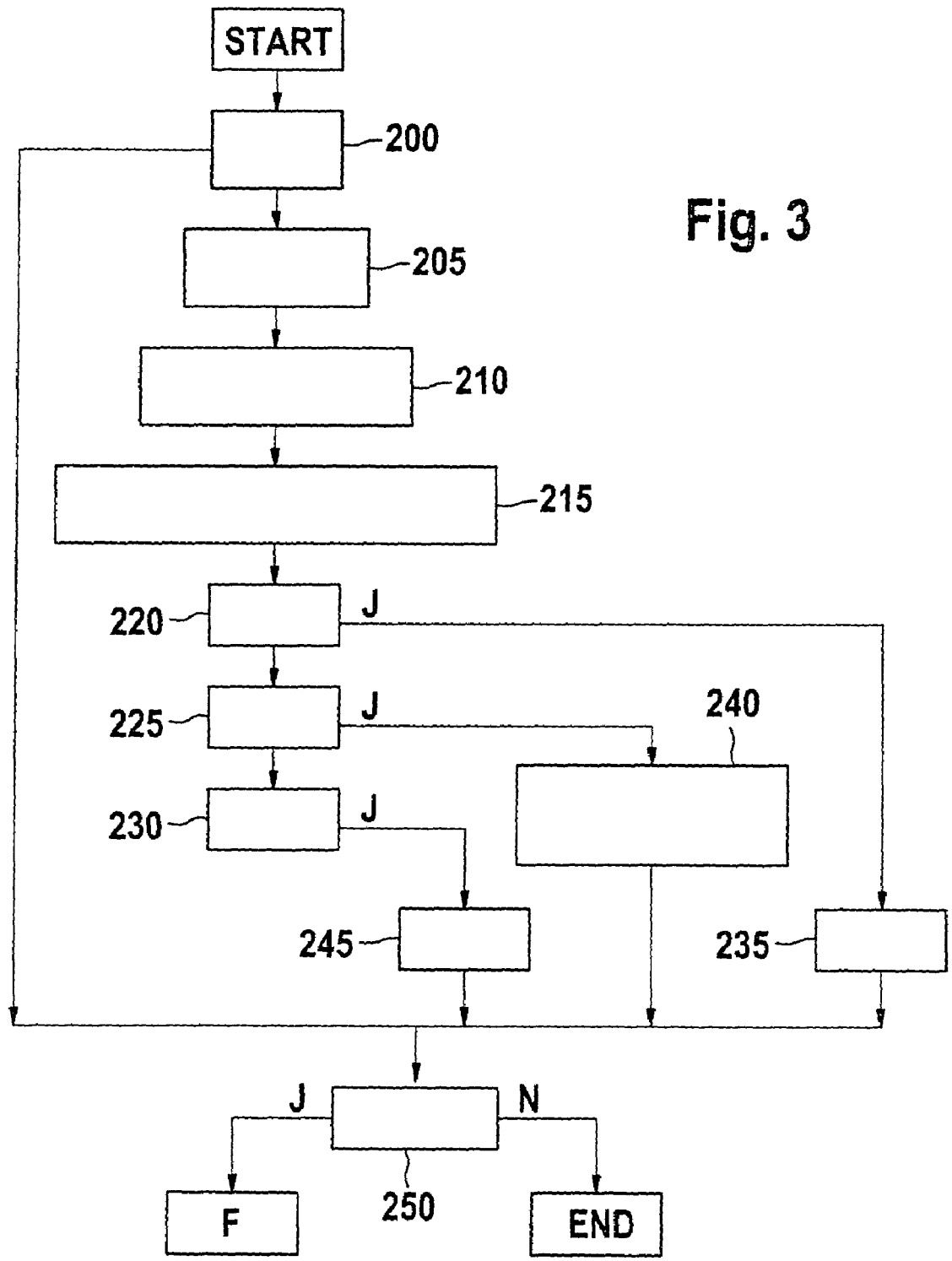
FIGS. 3 and 4 are flow charts illustrating detection of the malfunction in the two operating modes.

FIG. 3 illustrates a detailed representation of the fault detection of operating mode I (170 of FIG. 2), i.e., in the event that no wheel-individual braking interventions occur independently of the driver, e.g., by the anti-lock braking system (ABS). The flow chart illustrates the situation with the fault detection being caused by the exceeding of pressure differences of the brake pressures at the wheel brakes of a motor vehicle axle. A corresponding program is executed for the additional axles of the motor vehicle or the illustrated program is consecutively executed for each axle.

In first step 200, brake-pressure variable $\Delta p_{corr}$ is determined from the offset-corrected wheel-brake pressures (115) as the pressure differential of the brake pressures at the wheel brakes of a wheel axle. In step 205, the averaged brake pressures of all wheel brakes N is determined from the offset-corrected brake-pressure variables according to the equation:

$$p_m = \frac{1}{N}\sum_{n=1}^{N} p_{corr,n}$$

An estimation of the rate of increase of the averaged brake-pressure variables takes place in step 210 via the differential quotient:

$$gp_m = \frac{p_m[k] - p_m[k-1]}{T},$$

k and k−1 representing two consecutive points in time at which the averaged brake pressure is determined, and T representing the time differential between these two instants. In step 215, the absolute amount of differential quotient $gp_m$ is subsequently formed and, to compensate for a short-term sudden drop according to:

$$gp\ max = \max\{|gp_m[k]|, |gp_m[k-1]|\}$$

maximum value $gp_{max}$ is determined over at least two calculations of differential quotient $gp_m$. In step 220, differential quotient $gp_{max}$ resulting in the process is compared to a lower value $gp_0$ that is typical for the brake system. When value $gp_0$ has or has not been attained, the permissible threshold value for brake-pressure differential $\Delta p_{all}$ at the wheel brakes, in step 235, is set to a lower specified value $\Delta p_{all,0}$ this value depending on the type of brake system. In the event that differential quotient $gp_{max}$ is greater than $gp_0$, in step 225, differential quotient $gp_{max}$ is compared to an upper value $gp_1$, which is typical for the brake system. If this value $gp_1$ has or has not been attained, the permissible threshold value for brake-pressure differential $\Delta p_{all}$ at the wheel brakes, in step 240, is set to a value according to the equation:

$$\Delta p_{all} = \Delta p_{all,0} + \frac{\Delta p_{all,1} - \Delta p_{all,0}}{gp_1 - gp_0} gp_{max},$$

$\Delta p_{all,0}$ and $\Delta p_{all,1}$ being two values that are specified on the basis of the brake system type. In step 230, the case will be examined where differential quotient $gp_{max}$ is above value $gp_1$. In step 245, the allowed threshold value for brake-pressure differential $\Delta p_{all}$ at the wheel brakes is then set to an upper specified value $\Delta p_{all,1}$ as a function of the type of brake system. If in step 250 the ascertained variable $\Delta p_{corr}$ from step 200 for the brake-pressure differential of the wheel brakes exceeds ascertained allowed threshold value $\Delta p_{all}$ from steps 235 through 245 at at least one axle, a fault (signal F/FIG. 1) is detected. Otherwise, the program is set back and restarted with the next polling cycle.

Figure 4:
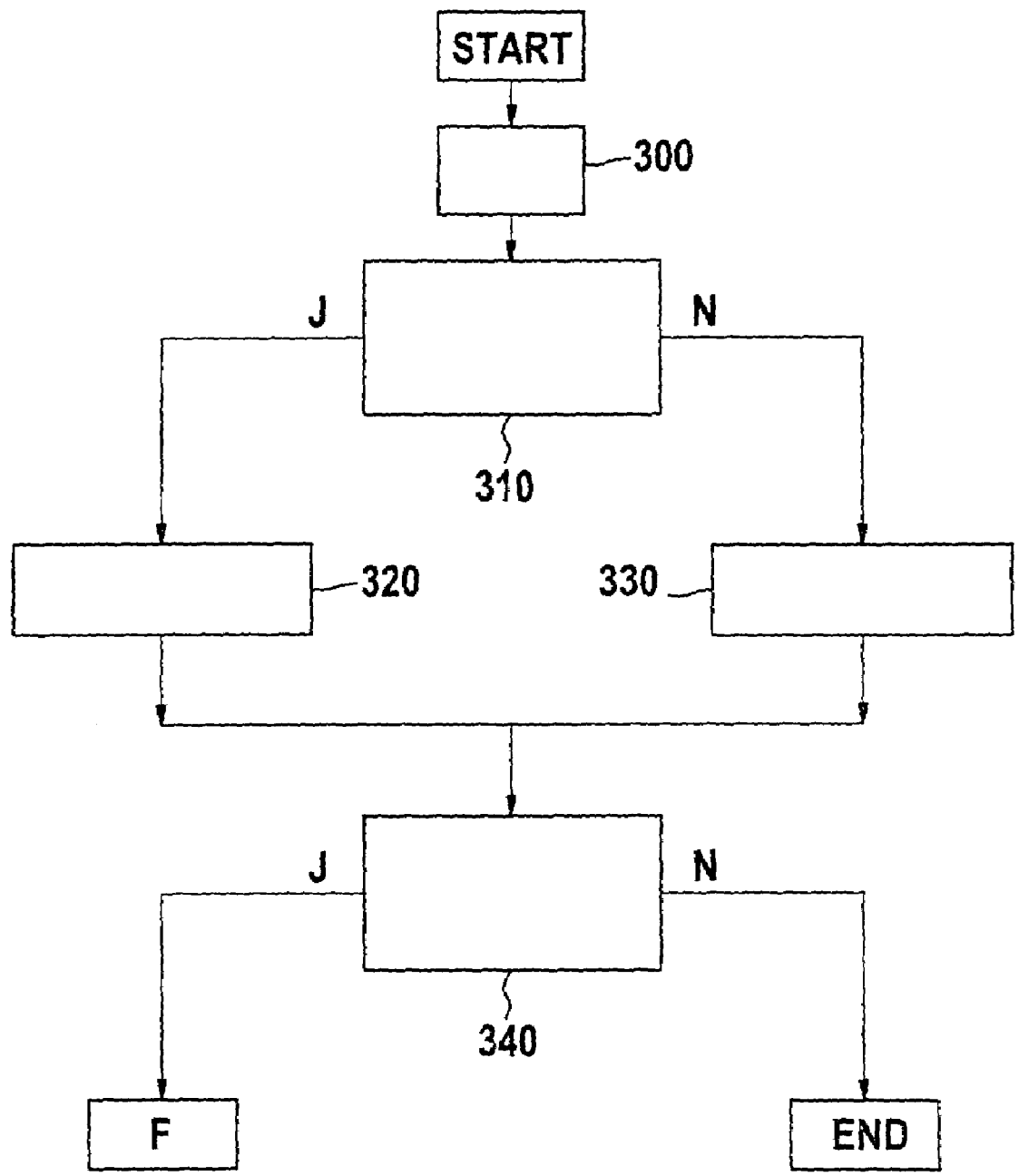

FIG. 4 illustrates a detailed representation of the fault detection in operating mode II (180 of FIG. 2), i.e., in the event that a wheel-individual braking intervention occurs, e.g., an intervention by the anti-lock braking system (ABS) during a driver-activated braking procedure. The flow chart illustrates the situation in a fault detection caused by the exceeding of pressure differences of the brake pressures at the wheel brakes of a motor vehicle axle. For the other axles of the motor vehicle, a corresponding program is executed or the illustrated program is consecutively executed for each axle.

In step 300, as in step 200 (FIG. 2), brake-pressure variable $\Delta p_{corr}$ is determined from the offset-corrected wheel-brake pressures as pressure differential of the brake pressures at the wheel brakes of a wheel axle. Furthermore, pressure signal $p_a$ for the admission pressure in the main brake cylinder of the brake system and differential quotient $gp_m$ are recorded as measure for the dynamics of the averaged brake pressure at the wheel brakes of an axle. Subsequently, in step 310, it is ascertained whether the pressure signal for the admission pressure falls below a specified threshold value $\Delta p_{ABS,0}$ and the averaged brake pressure at the wheel brakes of an axle simultaneously drops in the form of a negative differential gradient. If this is the case, in step 320, permissible threshold value $\Delta p_{ABS,S}$ for the pressure differential is set to specified limit value $\Delta p_{ABS,0}$. If one of the conditions in step 310 is not given, allowed threshold value $\Delta p_{ABS,S}$ for the pressure differential is set to equal the pressure signal of the admission pressure in step 330. If recorded brake-pressure differential $\Delta p_{corr}$ from step 300 exceeds ascertained threshold value $\Delta p_{ABS,S'}$, a fault (signal F/FIG. 1) is detected in step 340. Otherwise, the program will be set back and restarted with the next polling cycle.

In summary, a method and a device for monitoring a brake system, e.g., a wheel-pressure sensor suite of a brake system of a motor vehicle, are provided in which the fault detection (block 10) is implemented on the basis of a differential threshold (250, 340) being exceeded by a signal, which is representative for the difference in the brake pressures at the individual wheel brakes of a wheel axle. In the process, the differential threshold is set as a function of the averaged rate of increase of the individual pressures at the wheel brakes (235 to 245, 320 to 330). The fault detection is implemented on the basis of a model, which takes the instantaneous operating state of the brake system into account.

What is claimed is:

1. A method for detecting a malfunction of a brake system of a motor vehicle, wherein the motor vehicle includes at least one wheel axle, one of two different operating modes being present during activation of the brake system, the method comprising:
   detecting a malfunction of the brake system in a first manner when a first operating mode is present;
   detecting a malfunction of the brake system in a second manner when a second operating mode is present;
   during activation of the brake system, modifying and detecting brake pressures at at least two wheel brakes of an axle;

ascertaining a differential variable that represents a difference of the detected brake pressures;
implementing fault detection separately at each wheel axle on the basis of the differential variable exceeding a differential threshold, wherein the differential threshold has different values;
determining a differential quotient as a function of a difference of two averaged brake-pressure variable recorded at different times;
ascertaining a rate of increase of the brake pressure by estimation based on the differential quotient and based on a maximum value from at least two differential quotients; and
upon detection of the first operating mode, setting the different values of the differential threshold on the basis of the rate of increase of the brake pressure averaged with all brake pressure variables of an axle.

2. The method according to claim 1, wherein the method is adapted to detect a malfunction of a wheel-pressure sensor suite of the brake system of the motor vehicle.

3. The method according to claim 1, wherein the brake system is configured to implement braking interventions independently of a wish of a driver of the motor vehicle, the method further comprising:
detecting existence of the first operating mode when no wheel-individual braking intervention occurs during a braking operation; and
detecting existence of the second operating mode when a wheel-individual braking intervention occurs during a braking operation.

4. The method according to claim 1, wherein the brake pressure variables include offset-corrected brake pressure variables, the method further comprising:
estimating an offset from a low-pass filtered brake pressure signal of each wheel brake.

5. The method according to claim 1, wherein the brake system includes a main brake cylinder configured to generate a brake admission pressure, the method further comprising:
upon detection of the second operating mode, setting a value for the differential threshold as a function of: (a) an admission-pressure variable that represents the admission pressure in the main brake cylinder; and (b) a rate of increase of a differential quotient.

6. The method according to claim 1, further comprising, following a wheel-individual braking intervention, modifying a fault detection for a specifiable time duration to suspend the fault detection for the specifiable time duration following the wheel-individual braking intervention.

7. A device for detecting a malfunction of a brake system of a motor vehicle, wherein the motor vehicle includes at least one wheel axle, one of two different operating modes being present during activation of the brake system, comprising:
an arrangement configured to detect a malfunction of the brake system in a first manner when a first operating mode is detected and to detect a malfunction of the brake system in a second manner when a second operating mode is detected;
an arrangement configured to modify and detect brake pressures at at least two wheel brakes of an axle during activation of the brake system;
an arrangement configured to ascertain a differential variable that represents a difference of the detected brake pressures;
an arrangement configured to implement fault detection separately at each wheel axle on the basis of the differential variable exceeding a differential threshold, wherein the differential threshold has different values;
an arrangement configured to determine differential quotient as a function of a difference of two averaged brake-pressure variable recorded at different times;
an arrangement configured to ascertain a rate of increase of the brake pressure by estimation based on the differential quotient and based on a maximum value from at least two differential quotients; and
an arrangement configured to set, upon detection of the first operating mode, the different values of the differential threshold on the basis of the rate of increase of the brake pressure averaged with all brake pressure variables of an axle.

8. The device according to claim 7, wherein the malfunction includes a malfunction of a wheel-pressure sensor suite of the brake system of the motor vehicle.

9. The device according to claim 7, wherein the brake system is configured to implement brake interventions independently of a wish of a driver of the motor vehicle, the arrangement configured to detect presence of the first operating mode when no wheel-individual brake intervention occurs during a brake operation and to detect presence of the second operating mode when a wheel-individual brake intervention occurs during a brake operation.

* * * * *